(12) United States Patent
Martin et al.

(10) Patent No.: US 6,205,158 B1
(45) Date of Patent: *Mar. 20, 2001

(54) NETWORK ARCHITECTURES WITH TRANSPARENT TRANSPORT CAPABILITIES

(75) Inventors: David Wright Martin, Nepean; Mohammed Ismael Tatar; Alan Glen Solheim, both of Kanata; Timothy James Armstrong, Stittsville; Mark Stephen Wight, Ottawa; Ronald J. Gagnon, Nepean; David John Nicholson, Ottawa, all of (CA)

(73) Assignee: Nortel Networks Limited, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 08/994,760

(22) Filed: Dec. 19, 1997

(51) Int. Cl.[7] .................................................. H04J 3/02
(52) U.S. Cl. .............................................. 370/541; 370/907
(58) Field of Search ................................ 370/242, 319, 370/337, 501, 503, 535, 539, 223, 238, 907, 541, 542, 543

(56) References Cited

U.S. PATENT DOCUMENTS

| | | | |
|---|---|---|---|
| 5,341,364 | * 8/1994 | Marra et al. ............................ 370/223 |
| 5,760,934 | * 6/1998 | Sutter et al. ............................ 359/119 |
| 5,841,760 | * 11/1998 | Martin et al. .......................... 370/242 |
| 5,923,646 | * 6/1998 | Mandhyan ............................. 370/254 |

* cited by examiner

Primary Examiner—Chau Nguyen
Assistant Examiner—Alexander Boakye
(74) Attorney, Agent, or Firm—Aprilla U. Diaconescu

(57) ABSTRACT

Architectures for a synchronous transport network of a telecommunications system using transparent transport capabilities are presented. The telecommunications network comprises a pair of transparent multiplexers (TMuxs) connected over a bidirectional high speed span for transparently transporting high rate traffic. Each TMux consolidates traffic from a plurality (I) of linear systems or a plurality of bidirectional self-healing rings, each ring ($K_i$) having a ring rate $R_i$ and at least two nodes ($A_i$, $B_i$). In another configuration, each TMux subtends a plurality of rings, such TMuxes being adapted for connection as ring nodes in a high-speed ring. The upgrades obtained with TMuxes in both the linear and ring configurations provide for per span relief for fiber exhaust where no changes to the existing systems are desired. As well, the bandwidth of an existing system may be increased on a per-span basis or the equipment count may be reduced.

11 Claims, 17 Drawing Sheets

FIGURE 9A  FIGURE 9B

NETWORK ARCHITECTURES WITH TRANSPARENT TRANSPORT CAPABILITIES

BACKGROUND OF THE INVENTION

1. Field of the Invention

This invention is directed to architectures for a transport network of a telecommunication system, and more particularly, to network architectures using transparent transport capabilities.

2. Background Art

The rapid evolution of the technology in recent years has made the optical fiber one of the most targeted transmission media, due mostly to the high transmission rates available and reduced error rates.

The Synchronous Digital Hierarchy (SDH) specifies a basic rate of 155.52 Mb/s, which is called synchronous transport module level-1 (STM-1). The smaller rate of 51.840 Mb/s is called synchronous transport signal level-1 (STS-1) and is the basic rate of the SONET (Synchronous Optical NETwork) version of SDH. Higher rates (STS-N, STS-Nc) are built from STS-1, and lower rates are subsets of this. An STS-N frame comprises an overhead (OH) field with administration, operation, maintenance and provisioning information, and a payload field with user information. The optical counterpart corresponding to an STS-N signal is called OC-N. To accommodate asynchronous signals from previous generations of transport equipment, North America (SONET) and Japan base their sub-STS-1 multiplexing hierarchies on the DS-1 rate of 1.544 Mb/s, while Europe (SDH) is based on the a 2.048 Mb/s rate. The level of synchronous multiplexing hierarchies where the schemes are common occurs at the European basic rate STM-1 and the North American rate STS-3. Thereafter, the three approaches multiplex these rates in multiple integers, all being compatible with the basic rates. While the present specification describes and illustrates signals of rate (or bandwidth) according to SONET networks, it is to be understood that the invention is applicable also to other synchronous networks.

It is well known that the topology of a synchronous optical network can have a linear point-to-point configuration or a ring configuration. A linear configuration protects the traffic on a working fiber (W) by using a protection fiber (P) which will carry the traffic if the working fiber is interrupted. A "1:1" system has an equal number of working and protection links, a "1:N" system has N working channels and one shared protection channel. Since the protection fiber is idle most of the time, extra-traffic (ET) of lower priority may be transmitted over the protection fiber.

The ring topology permits the network to also recover automatically from failures due to cable cuts and site failures. Currently, two types of SDH/SONET rings are used, namely unidirectional path switched rings (UPSR), and bidirectional line switched rings (BLSR). Both ring types support unidirectional and bidirectional connections.

The UPSR is typically used in the access network and therefore is built for lower rates, such as STS-3/STM-1, which are sufficient for access link demands. These rings are provided with bidirectional connections between nodes, yet the traffic flow is unidirectional. The signal is always present on both working and protection fibers, therefore, the protection fiber cannot be used to carry extra-traffic (ET).

The BLSR is typically used in the transport network, and therefore is built to operate at higher data rates, like STS-48/STM-16. For a four-fiber BLSR (4F-BLSR) the working and protection traffic flow on separate fibers, each for one direction. For a two-fiber BLSR (2F-BLSR), the fibers between adjacent nodes carry working traffic and also have protection capacity allocated within them. Bidirectional traffic between two adjacent nodes takes place in the working time-slots, and protection traffic is inserted in the protection time-slots. Since for a BLSR configuration the protection timeslots are only used during a protection switch, they can be used for lower priority ET. Due to the working timeslots reuse capability, a BLSR always provides the optimum use of bandwidth for a given traffic pattern. However, an automatic protection switching (APS) protocol is necessary.

A traffic node is defined as the transmission equipment deployed at a site. In practical configurations, a site may comprise equipment belonging to different networks co-located in the same operation center. Such scenarios are common in big cities. There are many benefits to supporting large bandwidths on a single piece of equipment. Reducing the amount of equipment at a site simplifies the network management and also means fewer trips to a location for equipment repairs and replacement. The key benefit is lower equipment cost.

Telecommunications network providers are feeling the pressure of upgrading the equipment to the level of the latest technologies, as users demand ever more capacity. That factor, along with the reality of fiber congestion in the network, is causing providers to search for a solution that will increase capacity without forcing them to deploy additional fibers.

For an existing linear system that is experiencing fiber exhaust on a given span, the traditional solution is to replace the relevant equipment to obtain a higher line rate system. However, for a ring configuration, the line rate of the entire ring must be upgraded even if only one span is short of fiber. It is thus easy to understand why some network providers are asking for other options.

The add/drop multiplexer combines various STS-N input streams onto an optical fiber channel. Transparent transport is defined herein as the ability to provide continuity of all payloads and associated overhead bytes necessary to maintain a lower bit rate linear or ring system through a higher bit rate midsection, while reducing the required number of fibers interconnecting the sites. The lower bit rate linear or ring system operates as if it were directly connected without the higher bit rate midsection. Description of a transparent multiplexer, referenced as "TMux", is provided in the U.S. patent application Ser. No. 08/847526, filed on Apr. 24, 1997 by Martin et al., assigned to Northern Telecom Limited and entitled "Transparent Multiplexer/Demultiplexer". A method for transparently transporting higher rates signals over a mid-span is disclosed in the U.S. patent application Ser. No. 08/847529, filed on Apr. 24, 1997 by Martin et al., assigned to Northern Telecom Limited and entitled "Transparent transport".

In summary, transparency in this specification implies that the bytes of the trib overhead are manipulated by the TMuxs such as to not require altering the provisioning of the existing systems, to maintain their protection switching, maintenance signalling, section/line/path performance monitoring, and to provide sufficient information for fault isolation. For example, if the trib rate is OC-48 and the midspan rate is OC-192, one solution possible is to carry the working (W) channels for all OC-48 trib systems on the OC-192 (W) channel, and the trib protection (P) channels over the OC-192 P-channel, without OC-192 protection switching enabled (defined in the above patents as the "nailed up" OC-192 option). In this arrangement, a failure of the OC-192 W-channel would trigger a span switch of all trib systems.

Eight OC-48 lines, or thirty OC-12/OC-3 lines can be consolidated over the high rate midspan, as detailed in the above mentioned patent applications. Bidirectional couplers may be used to further reduce the fiber count on the high rate span, i.e. from four to two fibers. It is to be noted that the bandwidth efficiency provided, 20 Gb/s bidirectional over two fibers, is accomplished without the transponders and tight tolerance transmitters and dense WDM couplers necessary in the equivalent WDM solution.

The invention is not limited to OC-3/OC-12/OC-48 trib signals carried by an OC-192 supercarrier, but it is also adaptable to other bit rates, in accordance with the hardware and software evolution of transport networks. Also, the invention is not limited to equipping of only identical trib rates, it is possible to carry transparently trib signals of different trib rates over the high rate span. The input tribs described in this invention have the same rate for an easier understanding of the general concept. In addition, the invention is not limited to SONET signals, and it can be applied to other synchronous transport technologies.

SUMMARY OF INVENTION

It is an object of the present invention to provide various architectures for upgrading telecommunication networks, which address fiber exhaust on a per span basis, without having to replace the equipment of all existing tributary (trib) systems. With this invention, an entire ring system does not have to be upgraded to a higher line rate due to fiber exhaust on a single span.

The invention is applicable to linear configurations and to ring configurations, such as OC-48 rings, although lower rate systems, such as OC-12 and OC-3 may also be upgraded. As well, the invention is applicable to higher rate rings, such as OC-192 2F-BLSR (two-fiber bidirectional line switched ring), and 4F-BLSR, where the high rate midsection is OC-768, for example.

It is another object of the present invention to provide a network architecture for a telecommunication system that permits tributary channels to be carried transparently over a high rate line, with no change in provisioning of tributary systems.

Accordingly, the invention is directed to a telecommunications network operating according to a synchronous transfer mode standard, comprising a pair of transparent multiplexers (TMuxs) connected over a bidirectional high speed span for transparently transporting high rate traffic, and a plurality (I) of bidirectional self-healing rings, each ring ($K_i$) having a ring rate $R_i$, and including at least two nodes ($A_i$, $B_i$) connected to each other and to the transparent multiplexers over a i-th W/P line for transporting working and protection traffic in a forward direction, and a i-th P/W line for transporting protection and working traffic in a reverse direction, wherein I is an integer, i is the index of a respective bidirectional self-healing ring, and i$\in$[1, I], and the high rate is the sum of all the ring rates $R_i$.

The invention is further directed to a telecommunications network operating in accordance with a synchronous transfer mode standard, comprising a transparent multiplexer (TMux) for connection into a high speed sub-network, a plurality (I) of bidirectional self-healing rings, each ring ($K_i$) including a subtended node connected to the transparent multiplexer over a i-th W/P line for transporting working and protection traffic in a forward direction, and a i-th P/W line for transporting protection and working traffic in a reverse direction at a ring rate $R_i$, wherein I, N are integers, i is the index of a respective bidirectional self-healing ring, and i$\in$[1, I], and the high rate is the sum of all the ring rates $R_i$.

Further, a transparent ADM for a telecommunications network operating according to a synchronous transfer mode standard, at a high traffic rate comprises a trib input port and a trib output port for respectively receiving K input tribs and transmitting K output tribs, each trib of a bandwidth $R_i$, an add/drop port for adding and dropping L local tribs, a transparent multiplexer for transparently multiplexing the K input tribs and the add local traffic into an output high rate signal, and a transparent demultiplexer for receiving an input high rate signal and demultiplexing same into the K output trib signals and the L drop tribs.

The invention also comprises a telecommunications network operating according to a synchronous transfer mode standard, comprising, a plurality (J) of transparent add-drop multiplexers (ADM-T) connected in a high rate bidirectional self-healing ring configuration over a high speed span, at each ADM-$T_j$ site, a plurality (L) of nodes subtended by the ADM-$T_j$ and connected to the ADM-$T_j$ over a l-th W/P line for transporting working and protection traffic in a forward direction, and a l-th P/W line for transporting protection and working traffic in a reverse direction at a ring rate $R_l$, a plurality (M) of bidirectional self-healing rings including the ADM-$T_j$, each ring ($K_m$) including at least two nodes connected to each other and to the ADM-$T_j$ over a m-th W/P line for transporting working and protection traffic in a forward direction, and a m-th P/W line for transporting protection and working traffic in a reverse direction at a ring rate $R_m$, wherein J, L, and M are integers, j is the index of a respective ADM-T in the high rate bidirectional self-healing ring configuration, l is the index of a respective subtended node, m is the index of a respective bidirectional self-healing ring, and the high rate is $L \times R_l + M \times R_m$.

Further there is provided a telecommunications network operating according to a synchronous transfer mode standard, comprising, a first ADM and a second ADM connected in a main network over a high speed span for transmitting a high rate signal including a main signal and a subsidiary signal, a first traffic node (A) at the site of the first ADM and a second traffic node (B) at the site of the second ADM for communicating to each other over the subsidiary signal, a first additional input/output port at the first ADM for transferring the subsidiary signal to and from the first traffic node, and a second additional input/output port at the second ADM for transferring the subsidiary signal to and from the second traffic node.

A basic advantage of this invention is per span relief for fiber exhaust where no changes to existing systems are desired.

Another advantage is that a pair of TMuxs at the sites connected by the high line rate span may be a less expensive solution than the WDM (wavelength division multiplexing) approach for some network applications. For example, only one OC-192 electrical repeater is needed on the high rate span according to the invention, while four electrical repeaters are necessary in the OC-48 WDM approach. The cost of four OC-48 repeaters is about 1.6 times the cost of one OC-192 repeater. In addition, the WDM approach to accommodate higher rates on an existing network requires replacing the initially installed transmitters with a set of tight tolerance wavelength-specific (e.g. 1533 nm, 1541 nm, 1549 and 1557 nm) transmitters, adding to the overall cost of the upgrade.

Another advantage of the transparency is that there are no potential mid-span meet problems with the TMux-to-trib system interface regarding protection or data communication protocols, which may be the case for conventional Mux/trib system interfaces.

In this specification, the term 'nested ring node' is used for a traffic node which transports tributary traffic transparently over the high speed line to another nested ring node, where each nested ring node, although physically located in the higher rate system, behaves as a stand-alone tributary rate ring node.

In this specification, the term 'subtended ring node' is used for a traffic node which terminates tributary system traffic at that node, where the subtended ring node, although physically located in the higher rate system, behaves as a stand-alone tributary rate ring node.

BRIEF DESCRIPTION OF THE DRAWINGS

The foregoing and other objects, features and advantages of the invention will be apparent from the following more particular description of the preferred embodiments, as illustrated in the appended drawings, where:

FIGS. 9A, 9B and 9C illustrate use of TMux configurations as interim steps in upgrading of a ring;

DESCRIPTION OF THE PREFERRED EMBODIMENT

Figure 1A:
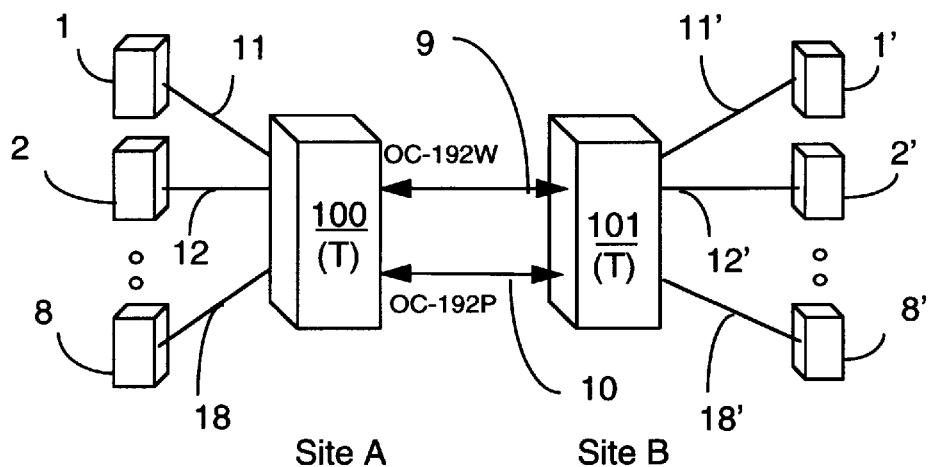
FIG. 1A illustrates a basic "span-by-span" application of the transparent multiplexer (TMux)

In the example illustrated in FIG. 1A, eight OC-48 2F-BLSRs have traffic nodes 1, 2 . . . 8 and 1', 2' . . . 8', respectively, in two adjacent sites A and B, which could be two metropolitan areas with heavy traffic. Without TMuxs, each ring would need a fiber span between sites A and B, resulting in sixteen fibers between sites A and B. In order to reduce the fiber count, each site A, B was equipped with a respective transparent multiplexer (TMux) 100, 101, which results in all traffic for the OC-48 rings being carried over a high rate 4F midspan comprising fibers 9 and 10, each supporting bidirectional traffic at OC-192 rate. The OC-192 protection is disabled in this configuration, but any protection switching information on a respective trib system is transmitted from the input span 11, 12, . . . 18 to the output span 11', 12', . . . 18' on the midspan 9, 10.

Figure 1B:
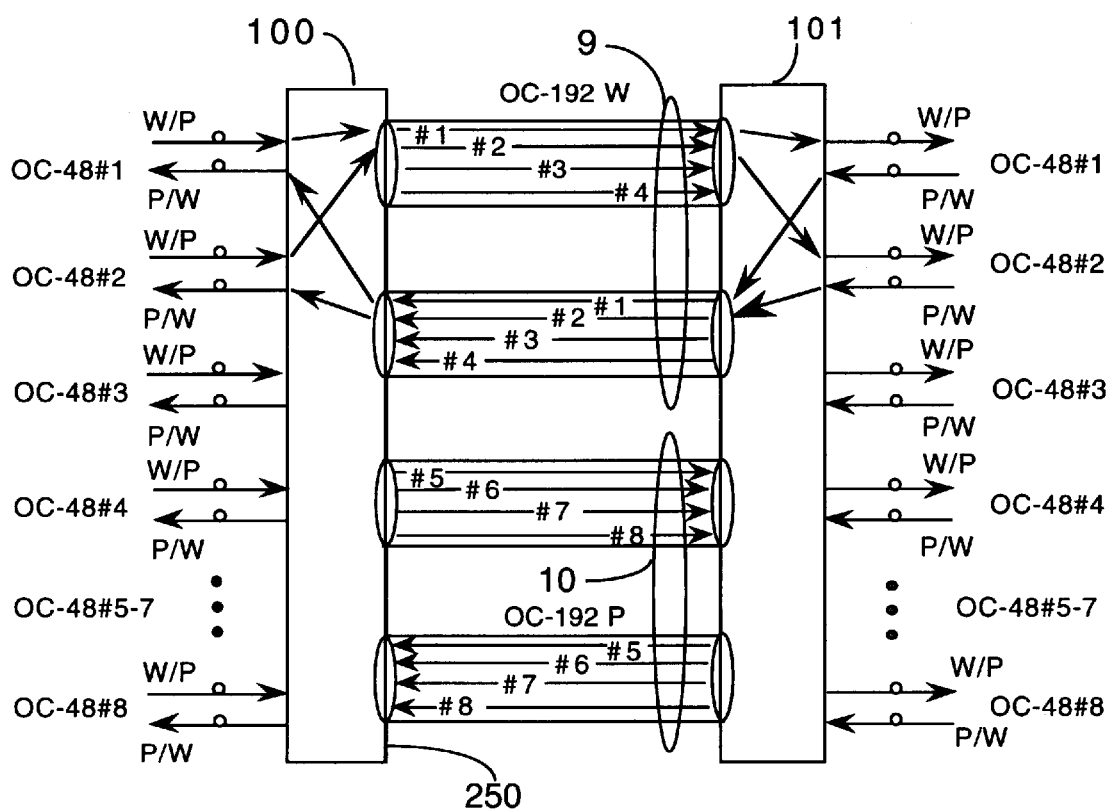
FIG. 1B illustrates how the eight OC-48 2F-BLSR tribs of FIG. 1A are carried transparently over a linear 4F OC-192 span using a "nailed-up" configuration (without protection for the OC-192 span)

FIG. 1B shows how the eight 2F OC-48 trib systems of FIG. 1A are carried transparently over the linear 4F OC-192 span using a 'nailed-up' configuration. For a 2F-BLSR trib system protection type, the traffic can be carried over either the OC-192 W-channel or the OC-192 P-channel without OC-192 protection switching enabled (hereinafter called the "nailed up" OC-192 option). As illustrated in FIG. 1B, the forward channels for four OC-48 trib systems are carried in the forward direction on the forward fiber of working (W) span 9, and the reverse traffic is carried on reverse fiber of (W) span 9. Similarly, the forward channels for four more OC-48 trib systems are carried in the forward direction over the forward fiber of protection (P) span 10 and over the reverse fiber of P span 10 in the reverse direction. Each fiber of the high-speed span carries a bandwidth of OC-192, resulting in a total bandwidth over span 9, 10 of 20 Gb/s. In this arrangement, a failure of either the OC-192 W-channel or P-channel would trigger a ring switch for the trib systems.

Figure 2A:
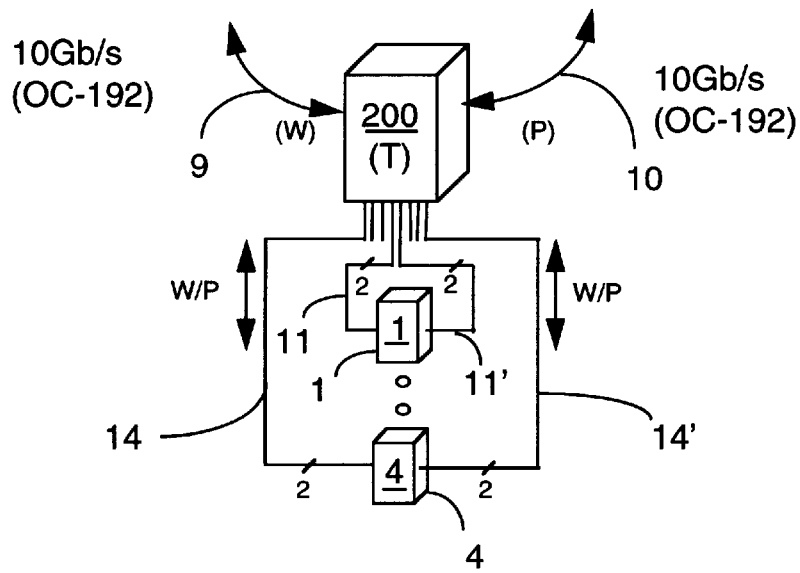
FIG. 2A illustrates a "ring" application of TMux as an OC-192 TMux node.

FIG. 2A shows a "ring" application of the TMux according to the invention where four OC-48 2F-BLSR rings 1–4 are connected to a TMux node 200 over spans 11, 11'; 12, 12'; 13, 13'; and 14, 14', respectively. Node 200 is in turn connected in an OC-192 ring over spans 9 and 10.

Figure 2B:
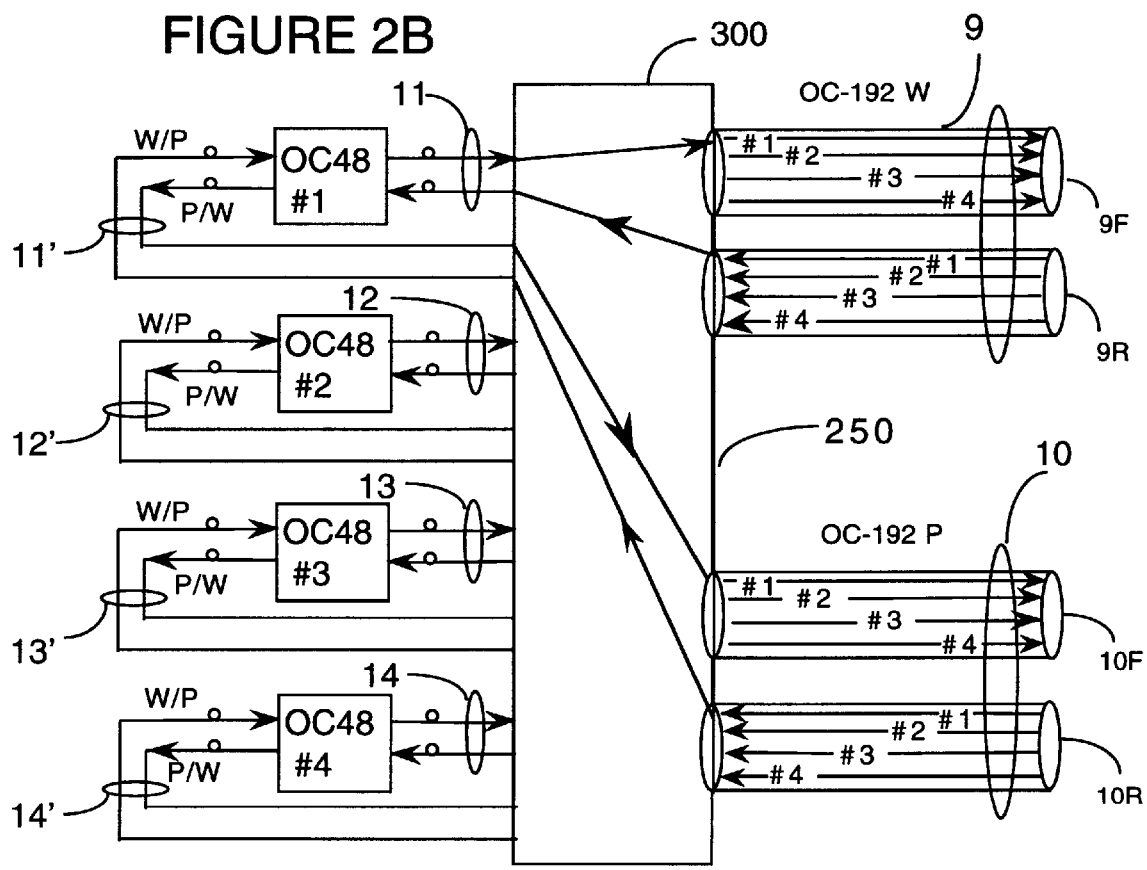
FIG. 2B illustrates how the four OC-48 2F rings of FIG. 2A are consolidated transparently for transmission over a OC-192 TMux ring.

FIG. 2B illustrates how traffic from the four OC-48 2F-BLSR rings of FIG. 2A are consolidated transparently for transmission over the OC-192 TMux ring. Since the trib rings are 2F-BLSRs, each bidirectional span 11 and 11' carries both working (W) and protection (P) traffic in the respective timeslots. For the forward direction (W-E), TMux 200 consolidates the OC-48 working traffic received over fibers 11–14 and transmits it over (W) fiber 9F. Similarly, protection traffic received from fibers 11' to 14' is transmitted over (P) fiber 10F. In the opposite direction (E-W), traffic received from fibers 9 and 10 is demultiplexed onto fibers 11–14 and 11'–14', respectively. OC-192 protection is again disabled in this configuration.

Figure 3A:
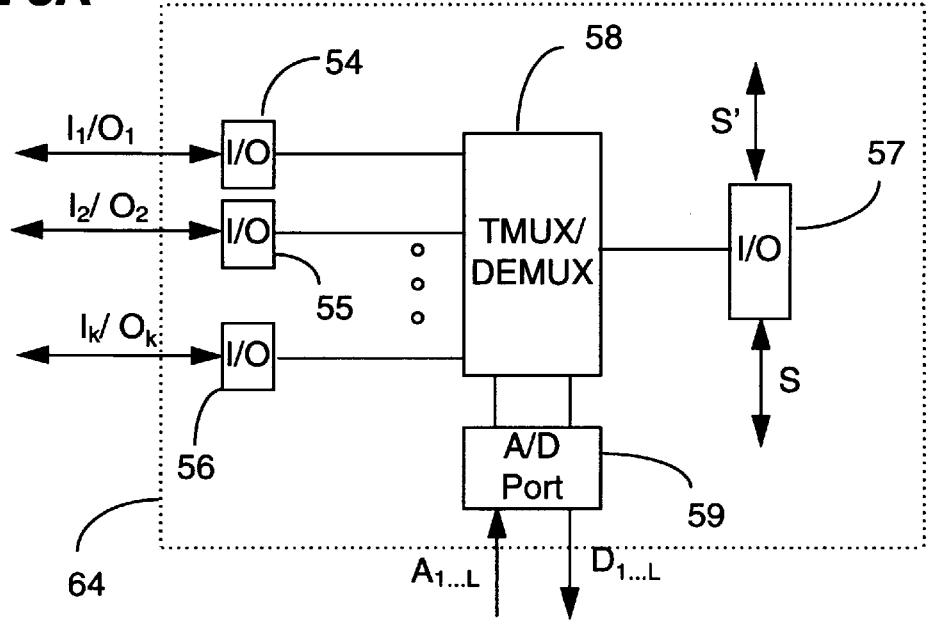
FIG. 3A illustrates an OC-192 ring/TMux node (ADM-T)

FIG. 3A shows the block diagram of an OC-192 ring/ TMux (ADM-T) node. A transparent add-drop multiplexer 64 receives input tribs $I_1$ to $I_K$ from K ports 54 to 56, each connected to a tributary network. TMux 58 also receives L local add signals $A_1$ to $A_L$ from add/drop port 59. These signals are transparently multiplexed into a supercarrier S which is output from port 57 into a high rate network, in this case an OC-192 ring. Similarly, TMux 58 receives high rate signal S' from the high rate network and demultiplexes same into K output trib signals $O_1$ to $O_K$, which are then inserted in the respective trib network through ports 54 to 56, each connected to a tributary network. TMux also provides L local drop signals $D_1$ to $D_L$ to port 59. Such a node may be used for upgrading networks to higher rates, or for saving on equipment, as shown next.

Figure 3B:
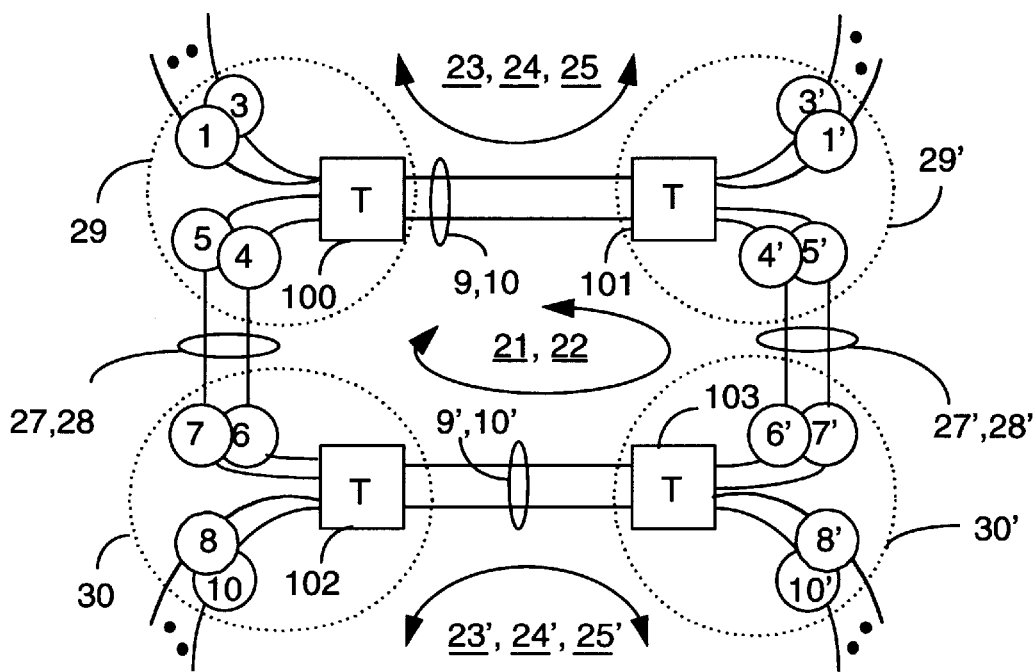
FIG. 3B illustrates a ring configuration with TMuxs, where the bandwidth over two spans needs to be increased.

FIG. 3B illustrates a configuration with eight OC-48 rings using TMuxs 100 to 103. In this configuration, OC-48 nodes 1–5 are co-located with TMux 100 in central office 29, nodes 1'–5' are co-located with TMux 101 in central office 29', nodes 6'–10' are co-located with TMux 103 in central office 30', and nodes 6–10 are co-located with TMux 102 at central office 30. A first OC-48 ring 21 includes TMuxs 100 and 101, nodes 4', 6', TMuxs 103 and 102, and nodes 6 and 4. Similarly, OC-48 ring 22 comprises nodes 100, 101, 5', 7', 103, 102, 7 and 5. TMuxs 100 and 101 are also connected in three OC-48 2F rings, a ring 23 also including nodes 1, 1'; ring 24, including nodes 2, 2'; and ring 25 including nodes 3, 3'. Similarly, TMuxs 102 and 103 are connected over ring 23' including nodes 8, 8', ring 24' including nodes 9, 9', and ring 25' including nodes 10, 10'.

Each TMux consolidates the traffic from its five tribs as in the configuration of FIG. 1A, therefore spans 9, 10, and 9', 10' each carry a bandwidth of 5×OC-48, while spans 27, 28 and 27', 28' carry 2×OC-48.

Figure 3C:
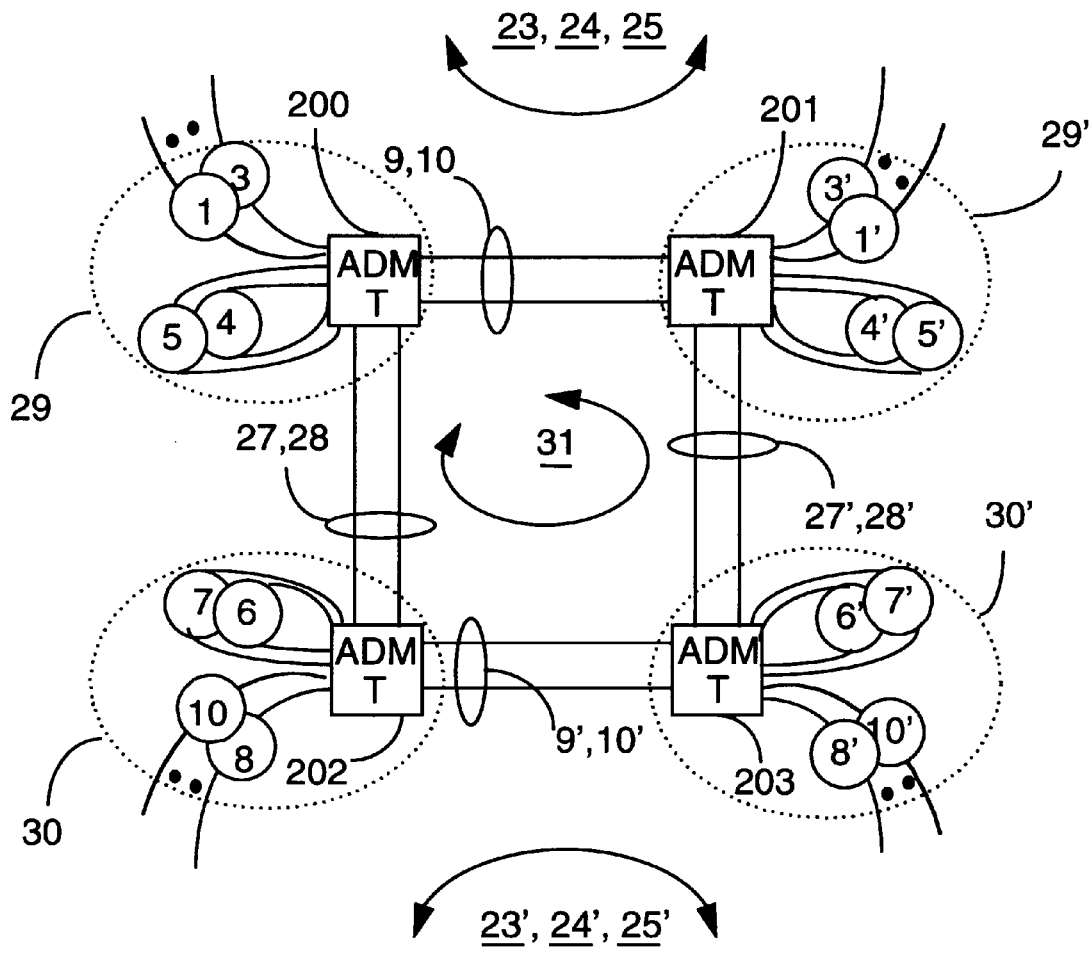
FIG. 3C illustrates an upgrade for the configuration of FIG. 3B using OC-192 ring/TMux nodes (ADM-T)

If due to customer demand more bandwidth is needed over the spans 27, 28 and 27', 28', TMuxs 100 to 103 can be upgraded to ADM-T nodes 200–203, as shown in FIG. 3C, and connected in an OC-192 4F ring 31, resulting in the configuration of FIG. 3C. No additional fiber needs to be deployed between any sites.

In this way, the OC-48 traffic (both working and protection) on rings 23–25 and 23'–25' is still carried transparently over the OC-192W channel. OC-48 nodes 4–7 and 4'–7' of rings 21 and 22, respectively, become subtended rings (multiple two-node rings), namely 4 and 5 are subtended by ADM-T 200, 4' and 5' are subtended by ADM-T 201, 6' and 7' are subtended by ADM-T 203, and 6 and 7 are subtended by ADM-T 202. This results in a used capacity of 4×OC-48 on spans 9, 10 and 9', 10', since nodes 4–7 and 4'–7' only add/drop STS-24 of working traffic each. One STS-48 only is used on spans 27, 28 and 27', 28'. As such, the configuration of FIG. 3C results in three additional STS-48s available on each of spans 27, 28 and 27', 28'.

Figure 4A:
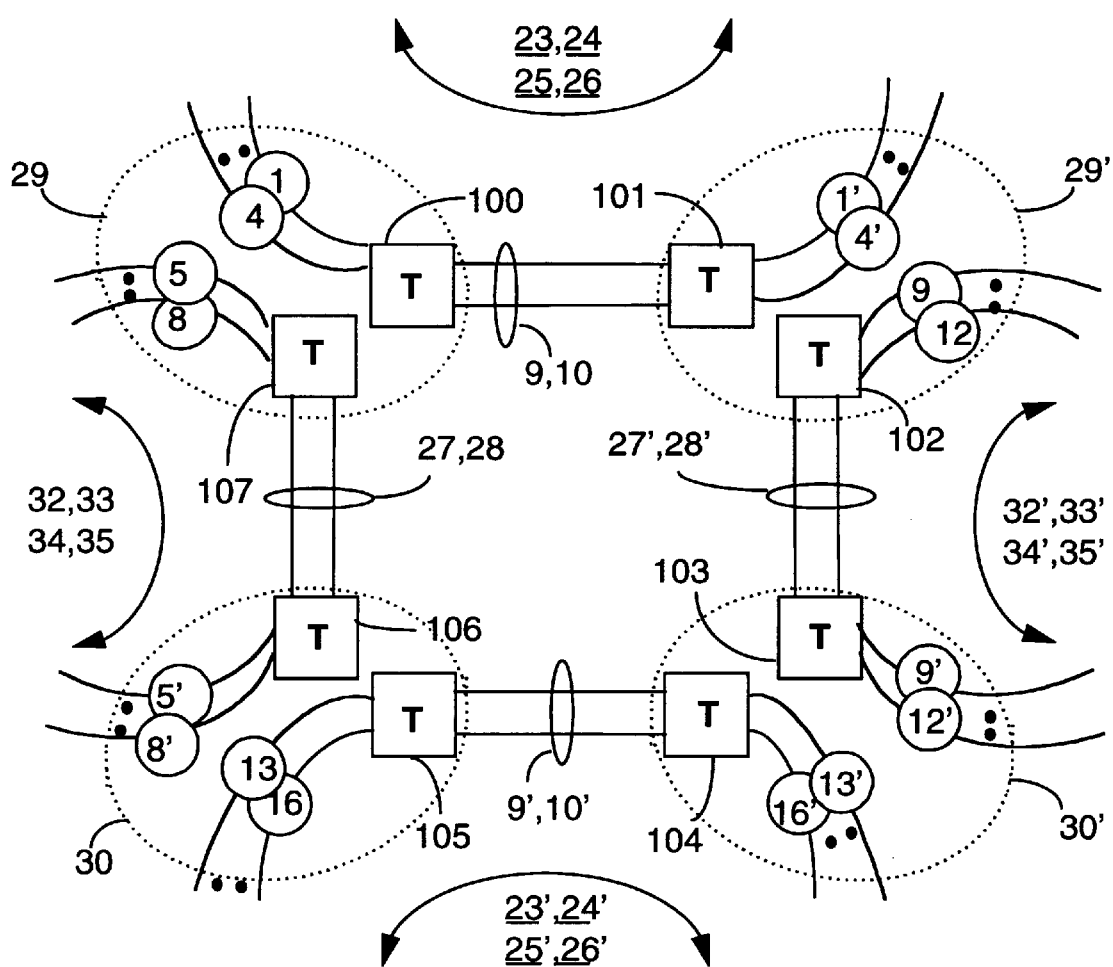
FIG. 4A illustrates a configuration with TMuxs before upgrade.

FIG. 4A illustrates sixteen OC-48 2F rings. The configuration uses TMuxs 100 and 101 provided at sites 29 and 29' respectively, for transparently transporting the traffic on four OC-48 rings 23–26 within an OC-192 supercarrier over span 9, 10. Similarly, TMuxs 102 and 103 deployed at sites 29' and 30', respectively, transport the traffic on four OC-48 rings 32'–35' within an OC-192 supercarrier over span 27', 28', TMuxs 104 and 105 deployed at sites 30' and 30, respectively, transparently transport the traffic on four OC-48 rings 23'–26' within an OC-192 supercarrier over span 9', 10', and TMuxs 106 and 107 deployed at sites 30 and 29, respectively, consolidate the traffic on four OC-48 rings 32–35 within an OC-192 supercarrier over span 27, 28. The OC-192 spans have protection disabled.

Figure 4B:
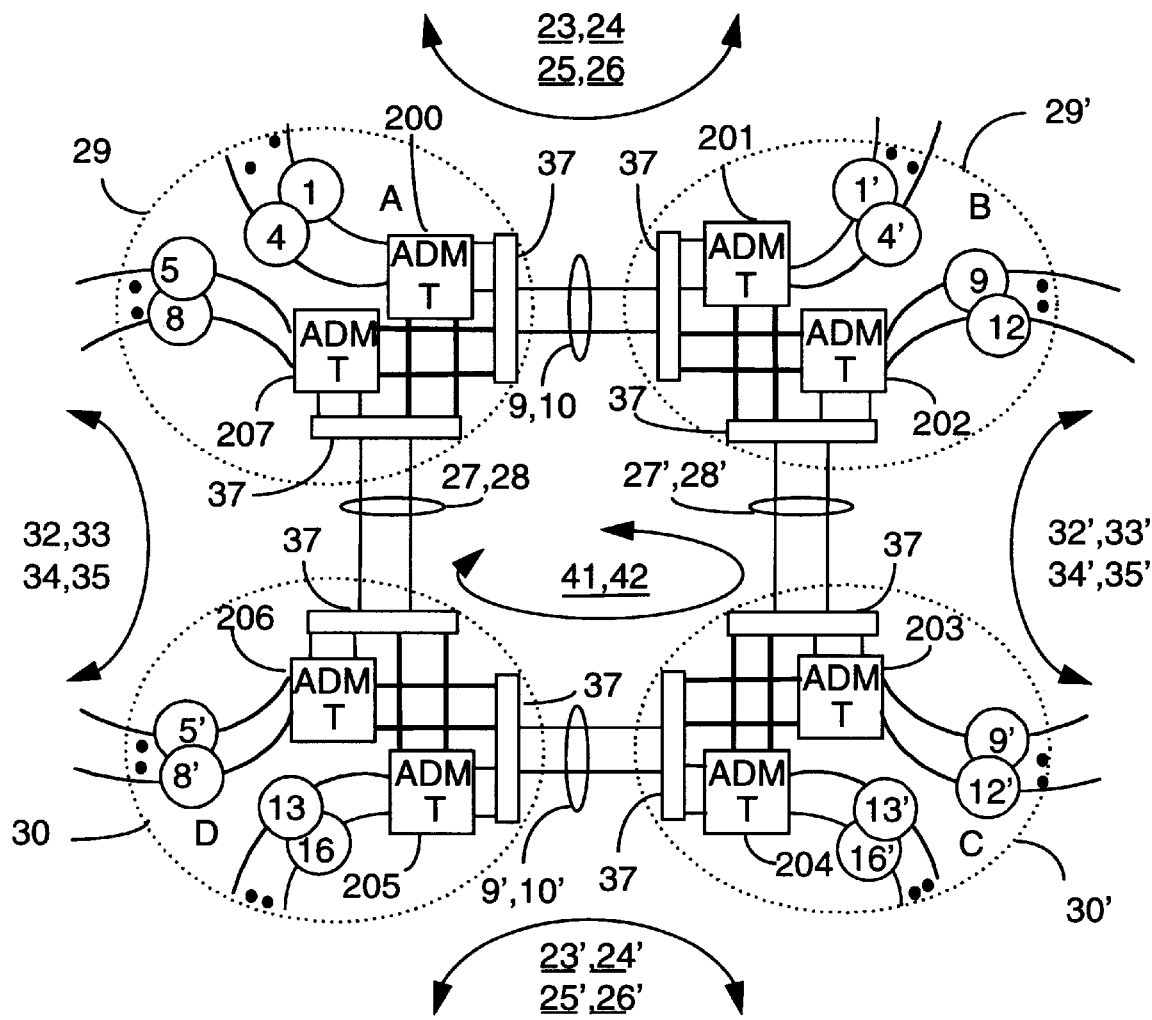
FIG. 4B illustrates an upgrade for the configuration of FIG. 4A, where the bandwidth between all nodes has been increased using OC-192 ADM-T nodes in conjunction with bidirectional couplers.

The customers' requests for more bandwidth between all sites can be addressed as shown in FIG. 4B, where the TMuxs were upgraded to OC-192 ADM-T nodes, which are connected in two OC-192 4F rings 41, 42, which use the same fiber spans 9, 10; 27', 28'; 9', 10' and 27, 28. Reference numeral 37 illustrates a group of four 2:1 couplers. Eight such groups are necessary for directing the traffic from the two ADM-Ts at a respective site over the high-rate spans, for both forward and reverse directions. The OC-48 ring segments between the sites involved are still carried transparently by the respective supercarriers. It is apparent that no additional fibers were deployed between any sites, and that four additional OC-48 tribs may be carried over ring 41, and 42 as shown by the thicker lines.

Figure 4C:
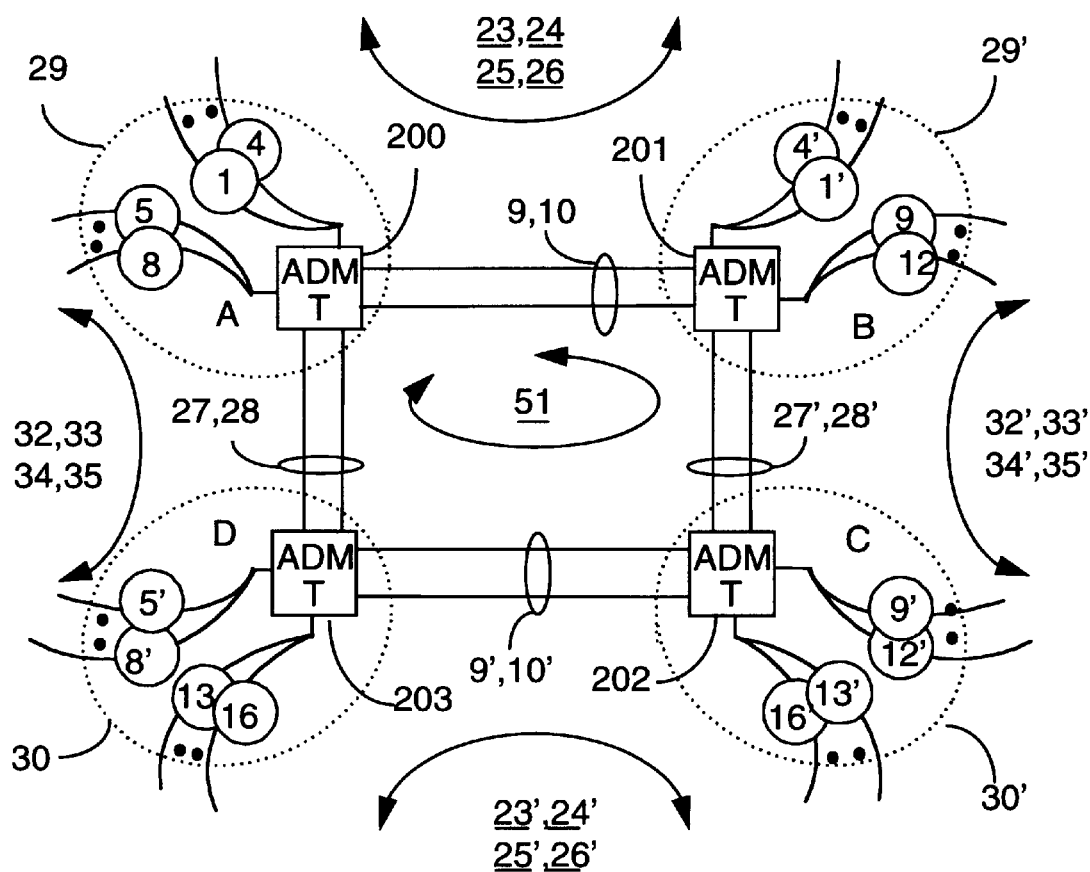
FIG. 4C illustrates an upgrade for the configuration of FIG. 4A using OC-192 ring TMux nodes (ADM-T), where the equipment count has been reduced.

On the other hand, if reduction of equipment is desired, the TMuxs at each site could be replaced by one ADM-T node connected in an OC-192 4F ring configuration 51, as shown in FIG. 4C. OC-48 ring segments are still carried transparently. No additional fiber span needs to be deployed in the configuration of FIG. 4C, while four OC-192 TMux nodes are freed-up.

Figure 5A:
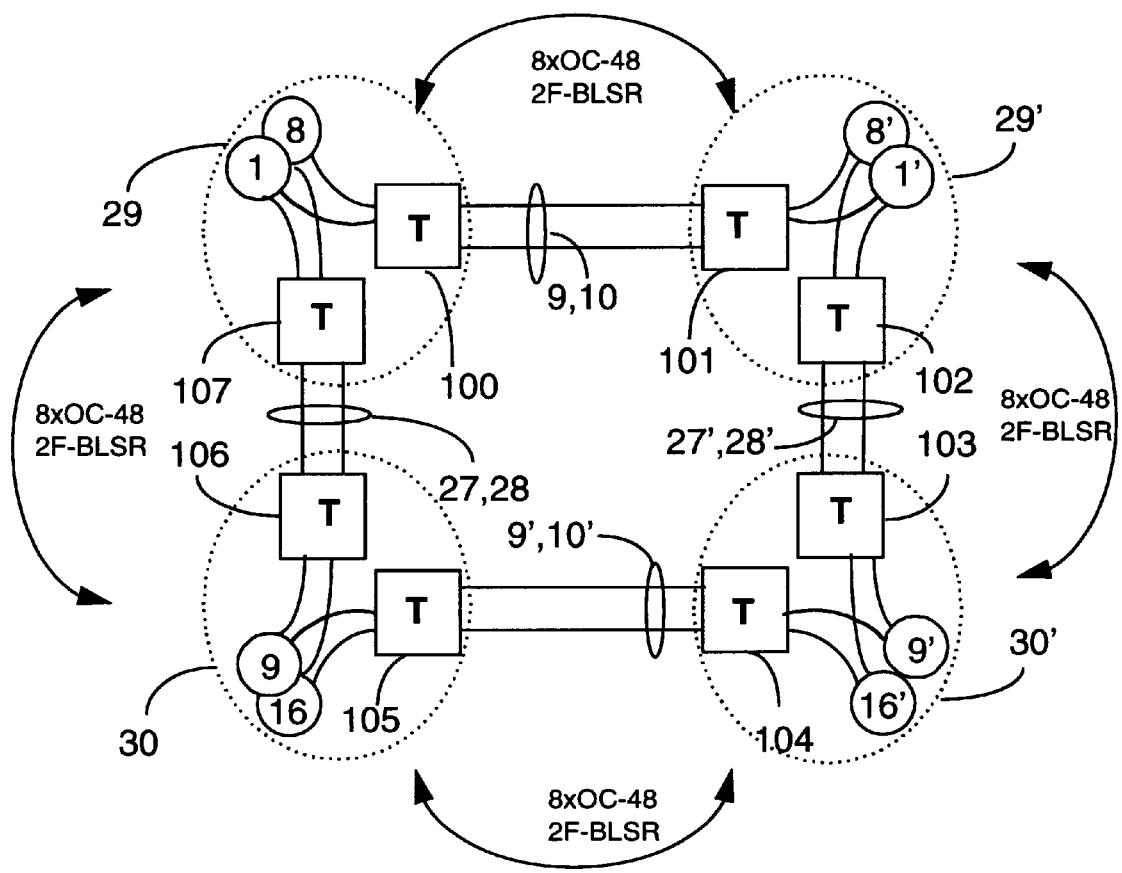
FIG. 5A illustrates another configuration with TMuxs before upgrade.
Figure 5B:
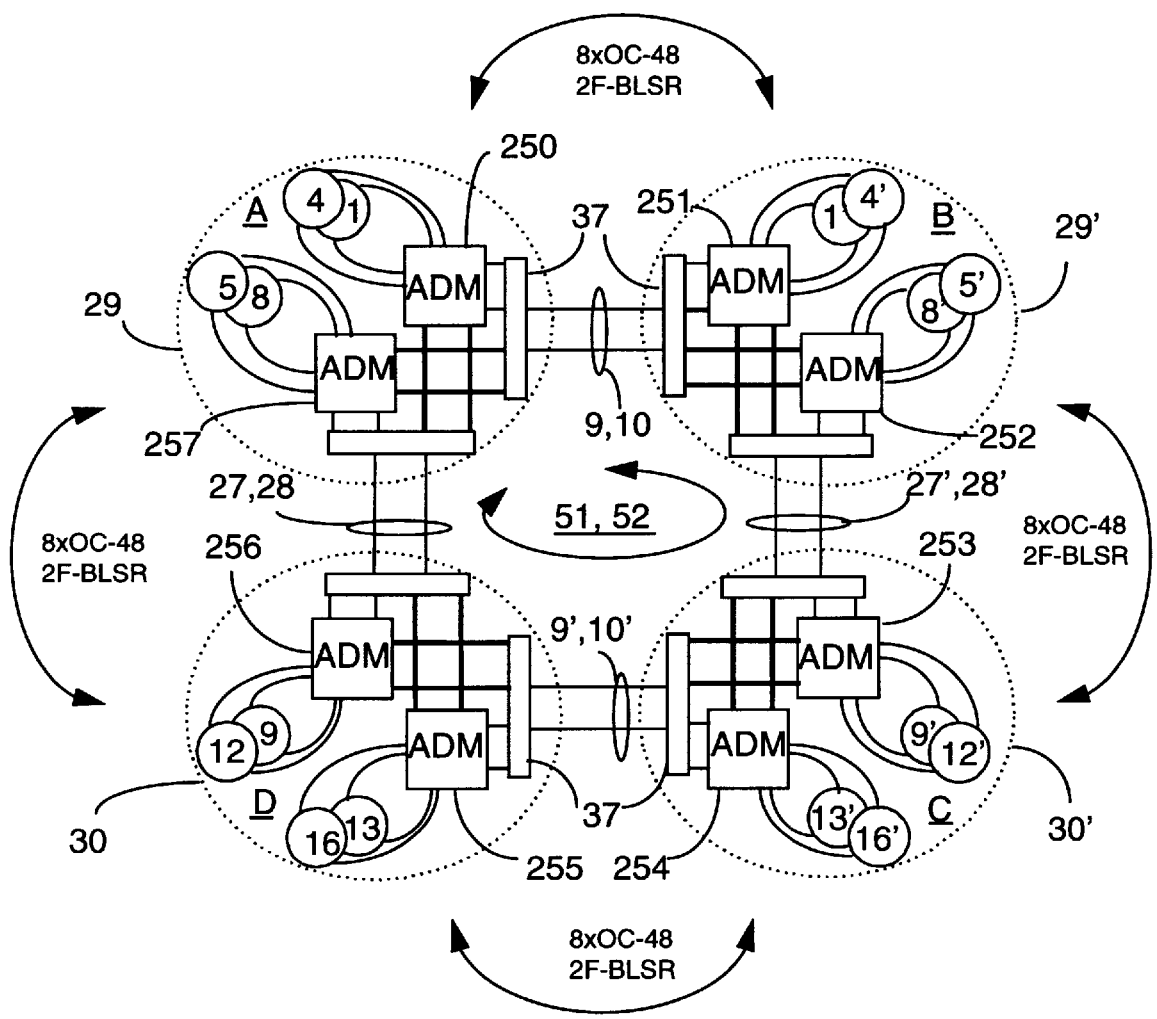
FIG. 5B illustrates an upgrade for the configuration of FIG. 5A where the bandwidth between all nodes has been increased using OC-192 ring nodes (ADM) in conjunction with bidirectional couplers.

FIG. 5A illustrates a first upgrade stage configuration with TMuxs. In the initial stage (not shown) nodes 1, 1', 9, 9'; 2, 2', 10, 10'; 3, 3', 11, 11'; 4, 4', 12, 12'; 5–5', 13, 13'; 6, 6', 14, 14'; 7, 7', 15, 15'; and 8, 8', 16, 16'; were connected in eight respective 2F OC-48 rings. As in the previous examples, nodes 1–8 are located at site 29, nodes 1'–8' are located at site 29', nodes 9'–16' are at site 30' and nodes 9–16, at site 30.

In the configuration shown in FIG. 5A, each site is provided with two TMuxs, a TMux for transparently transporting the traffic for all eight OC-48 rings to/from a neighbouring site. For example, TMux 100 and 101 consolidate the traffic between nodes 1–8 at site 29 and nodes 1'–8' at site 29'. Each span 9, 10, carries transparently traffic at OC-192 rate in both directions, with no protection enabled on the OC-192 span. Similar connections are provided between sites 29' and 30', 30' and 30, and 30 and 29.

The next upgrade stage involves replacing the TMuxs with OC-192 ring nodes 250–257 and connecting them into two OC-192 4F rings 51, 52. While two sets of four 2:1 couplers 37 are necessary at each site, resulting in a total of 32×2:1 couplers for accommodating the bidirectional nature of the traffic and for consolidating the traffic on four fibers, no additional fiber needs to be deployed between the sites. The OC-48 nodes 1–8; 1'–8'; 9–16; and 9'–16' are connected as subtended rings (multiple 2-node rings). As each OC-48 trib system uses at most a bandwidth of STS-24 of working traffic on the OC-192 node, each span 9, 10, carries only a bidirectional STS-96 of working traffic. This leaves a bidirectional STS-96 available over each ring and results in a bandwidth of four STS-48s available around the two rings 51, 52.

Figure 5C:
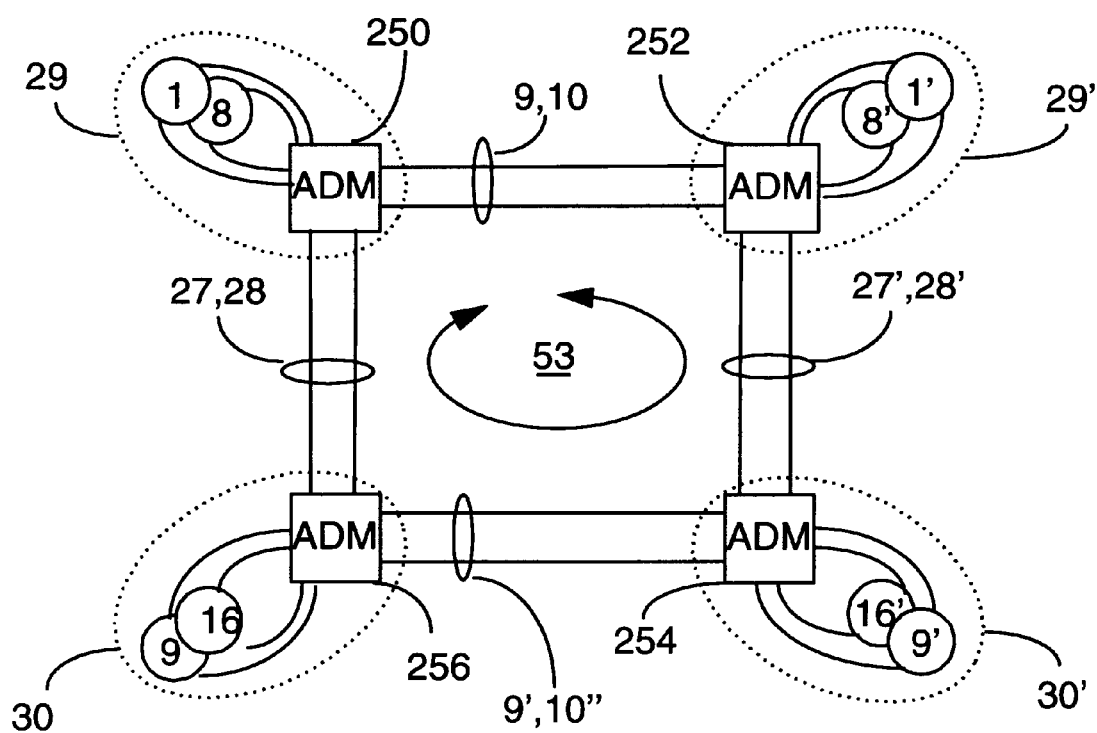
FIG. 5C illustrates an upgrade for the configuration of FIG. 5A using OC-192 ADM ring nodes, where the equipment count has been reduced.

FIG. 5C illustrates another upgrade for the configuration of FIG. 5A for savings on equipment. The eight TMuxs 100 to 107 are here replaced with four OC-192 ring nodes 250, 252, 254 and 256, to obtain an 4F OC-192 ring 53. Each OC-192 ADM subtends eight OC-48 nodes, resulting in four OC-192 nodes being freed-up. No additional fiber and equipment were necessary.

Figure 6A:
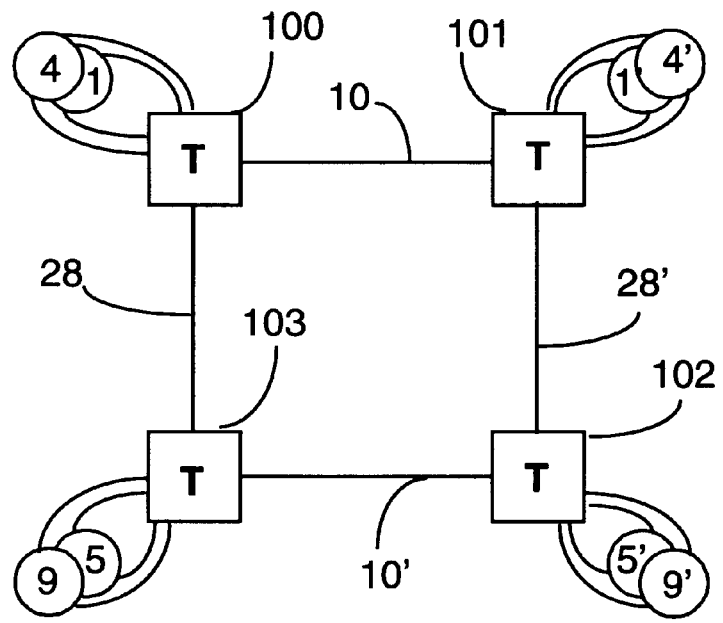
FIG. 6A illustrates a TMux-ring configuration before upgrade.
Figure 6B:
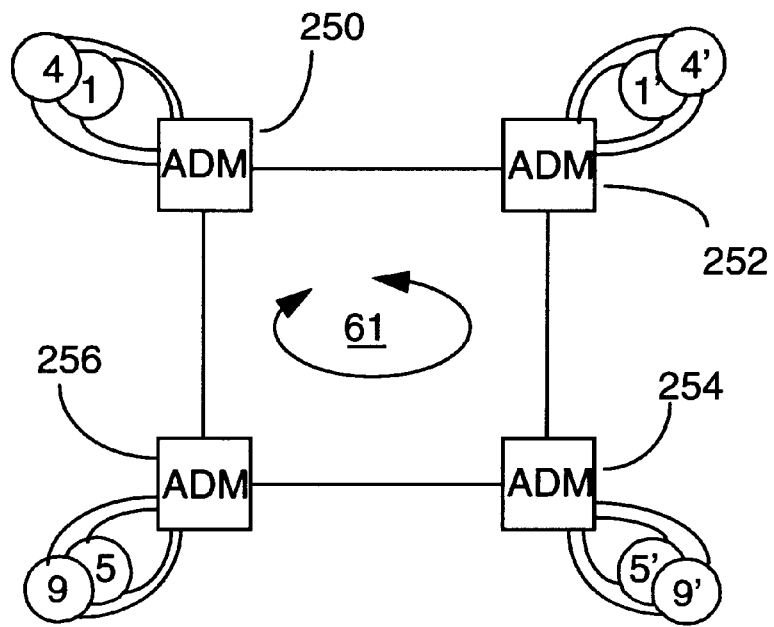
FIG. 6B illustrates the configuration of FIG. 6A upgraded to an OC-192 2F ring with subtended nodes.

FIG. 6A illustrates how traffic on four 2F OC-48 rings is carried transparently by an OC-192 configuration with four TMuxs 100–103. Each TMux carries four 2F OC-48 rings, as shown in FIG. 2A, and each span 10, 28', 10', and 28 carries an STS-192 between adjacent sites. An upgrade is shown in FIG. 6B where the TMuxs were replaced with OC-192 ring nodes 250, 252, 254 and 256 connected into a 2F ring 61. The OC-48 ring nodes are now subtended (multiple two-node rings). No additional fiber and equipment were necessary. This is an interim step to the upgrade of FIG. 6C.

Figure 6C:
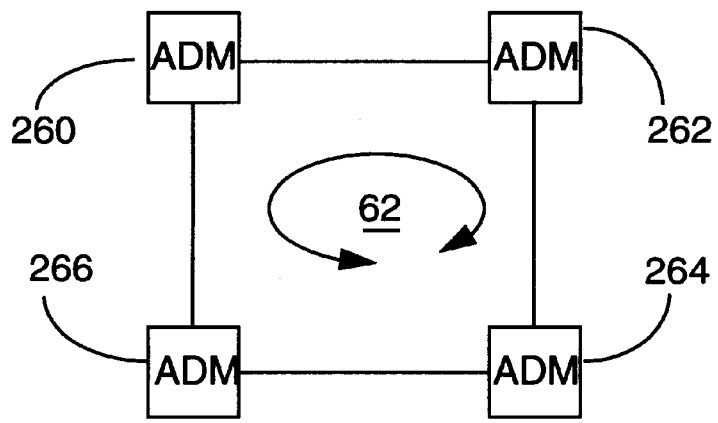
FIG. 6C illustrates a further upgrade for the configuration of FIG. 6B using OC-192 ring nodes where the equipment count has been reduced.

The next upgrade stage is shown in FIG. 6C, where the outboard OC-48 NEs were eliminated, so that 16 OC-48 ring nodes (4×4) were freed-up. The OC-192 ring nodes 260, 262, 264 and 266, and the resulting ring 62 is a 2F OC-192 which supports the same trib rates and quantities as the original subtended OC-48 ring nodes, as ring 61.

Figure 7A:
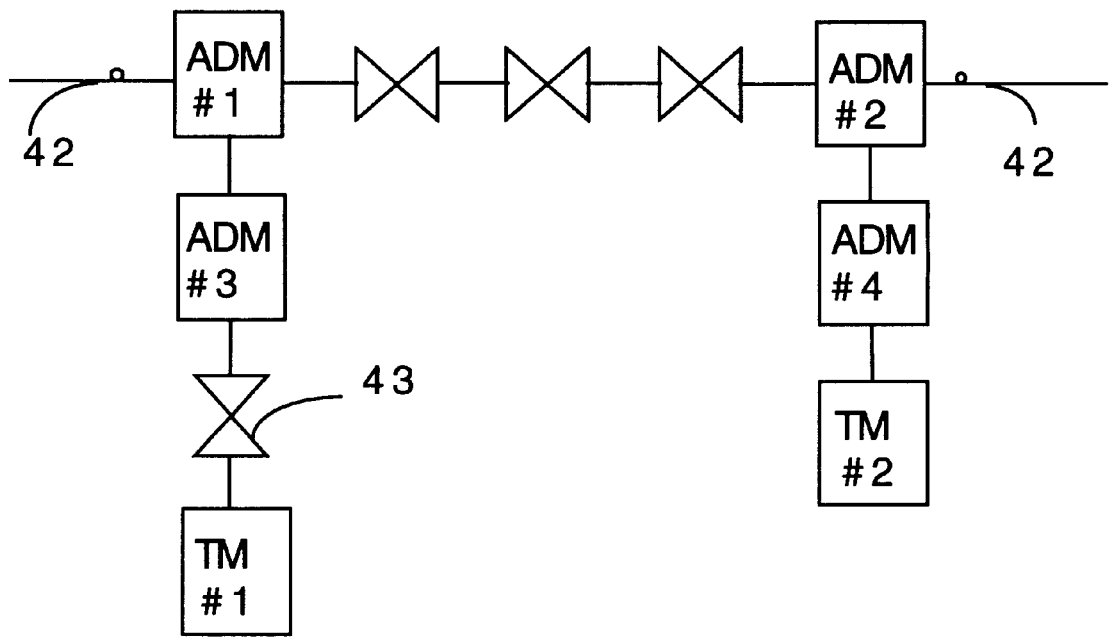
FIGS. 7A, 7B and 7C illustrate upgrade stages for a typical backbone/spur system, showing another application of the transparent transport according to the invention.
Figure 7B:
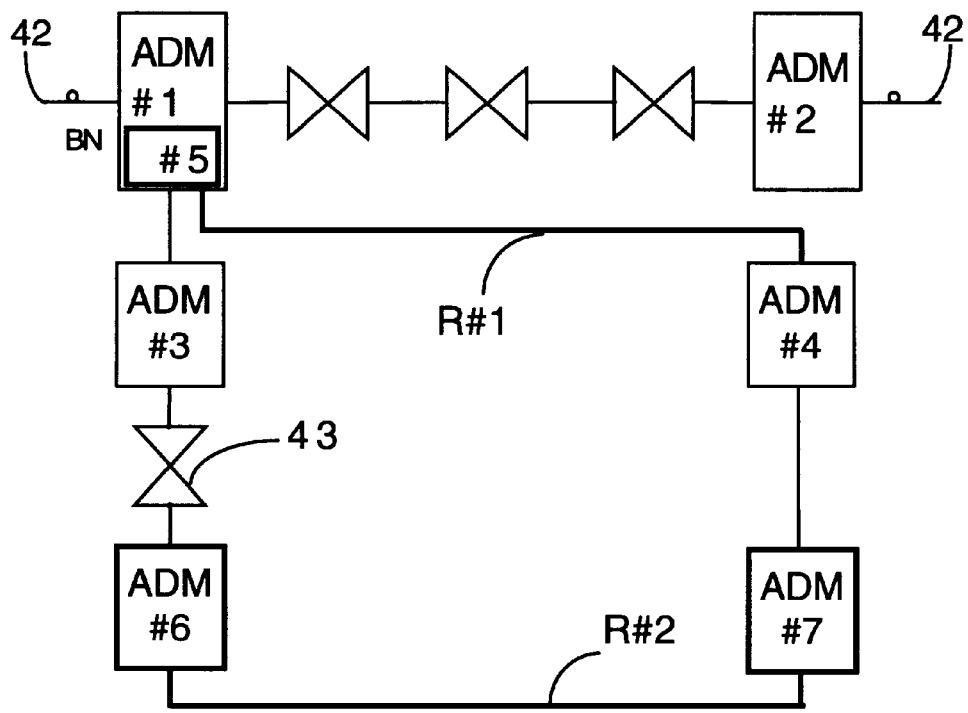
Figure 7C:
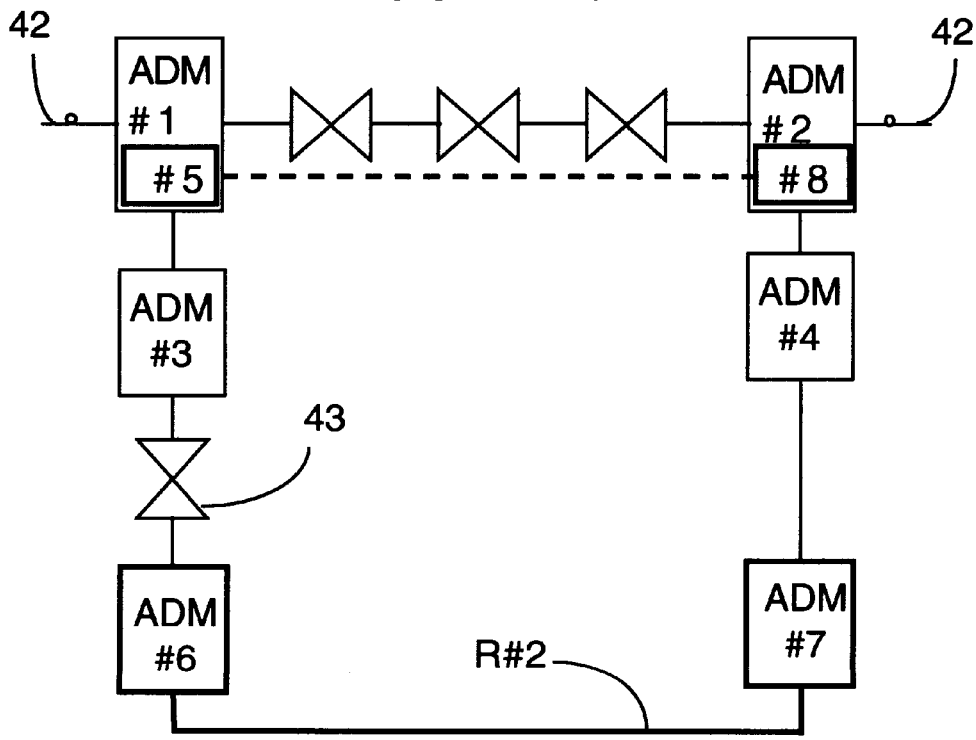

FIGS. 7A, 7B and 7C illustrate upgrade options for a typical backbone/spur system, showing a variation of the TMux referred to as nested trib rings. The system to be upgraded, shown in FIG. 7A comprises an OC-192 backbone network 42 deployed between ADM #1 and ADM #2. Terminal TM #1 is connected to the backbone over a lower rate spur including a regenerator 43, ADM #3 and a trib port in ADM #1, while terminal TM #2 is connected to the backbone through a separate lower rate spur system through ADM #4 and a trib port in ADM #2.

To improve the survivability of the spur networks, the network provider would like to close the spurs into a ring configuration. A subtended ring configuration is one option available without the TMux of the present invention, as shown in FIG. 7B. Two new routes are provided, R #1 between the sites of ADM #1 and ADM #4, and R #2 between terminals TM#1 and TM #2. As well, an additional tributary, which acts in conjunction with the existing tributary as an embedded ADM #5, must be added to ADM #1, and terminals TM #1 and TM #2 have to be upgraded to ADM #6 and ADM #7, respectively. The changes are shown in bold on FIG. 7B.

FIG. 7C shows a second option possible with TMux used in a nested trib ring. R #1 is not necessary in this configuration, resulting in fiber savings. The dotted line illustrates the channel carried by R #1 of FIG. 7B, which is now nested in part of the OC-192 line. The embedded ADMs #5 and 8 are not subtended ring nodes, but nested ring nodes, where their interconnecting span is nested in the OC-192 line. Thus, by upgrading a normal linear ADM chain to include a nested trib ring (FIG. 7C), the network operator achieves a more survivable collector network with only the addition of a single new route (R#2) rather than two as in the case shown in FIG. 7B (R#1 and R#2).

Figure 8A:
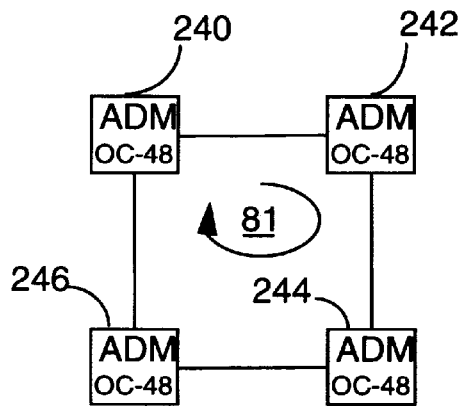
FIGS. 8A, 8B and 8C illustrate use of TMux configurations as interim steps in upgrading of a ring to a higher bandwidth.
Figure 8B:
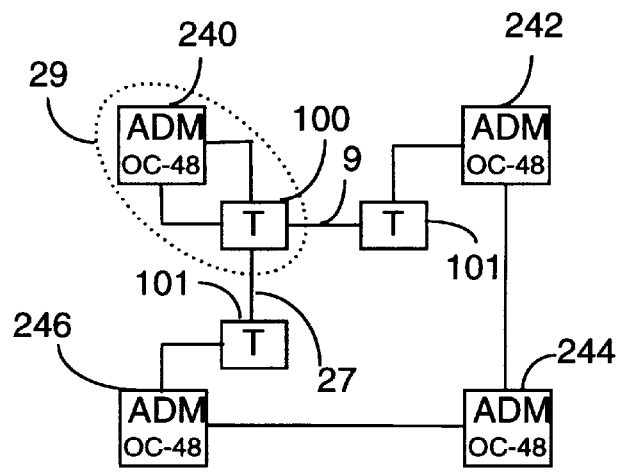
Figure 8C:
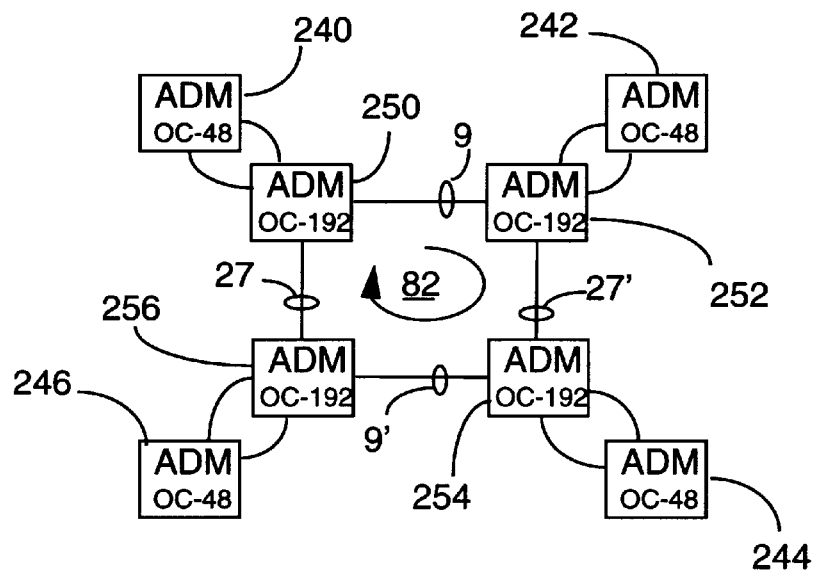

FIGS. 8A–8C illustrate the use of TMuxs in an interim configuration for upgrading an OC-48 2F ring 81 to an OC-192 2F ring 82. The OC-48 2F ring of FIG. 8A includes initially nodes 240, 242, 244, and 246, which are OC-48 ring nodes. During the interim stage shown in FIG. 8B, the traffic is rerouted onto three TMuxs 100, 101 and 102 to increase bandwidth on a per span basis. Thus, OC-48 traffic is carried between nodes 240 and 242 over a high speed span 9, while OC-48 traffic is carried between nodes 240 and 246 over high speed span 27. No additional fiber has been deployed between nodes 240, 242, and 246, as is the case when TMuxs are used. In the final stage shown in FIG. 8C, the entire ring has been upgraded to an OC-192 2F by reconfiguring TMux's to ring ADMs. OC-48 ring nodes are now subtended, i.e. connected to the respective OC-192 ring node as an OC-48 2F ring. Each span 9, 27', 9' and 27 carries an OC-192 of traffic.

Figure 9C:
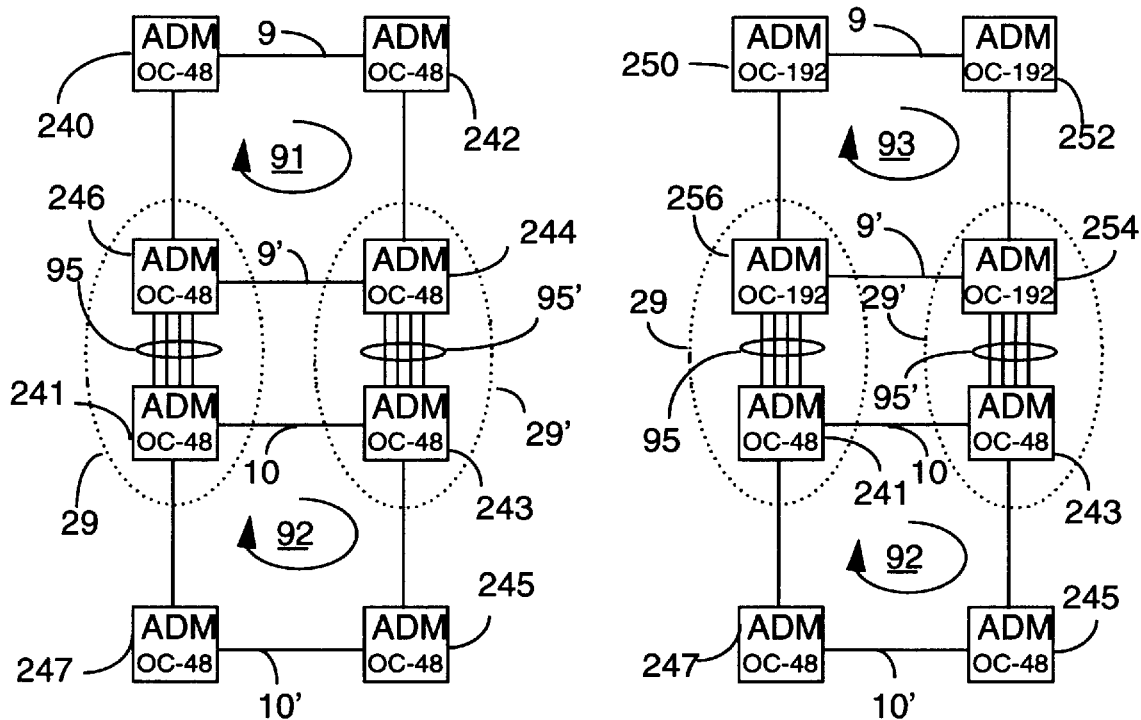

Still another example for illustrating use of TMux configurations as interim steps for upgrading an existing ring is shown in FIGS. 9A–9C. OC-48 and OC-192 2F rings were used for these examples, but rings of lower or higher rates may be upgraded in a similar way.

Figure 9C:
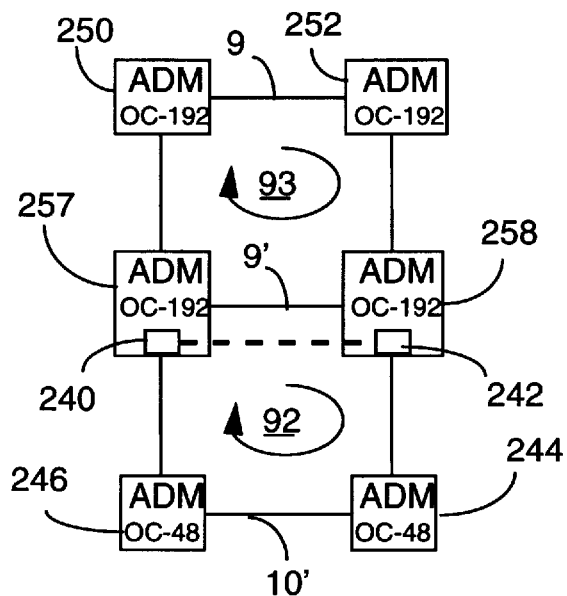

The example of FIG. 9 provides for two OC-48 2F rings 91 and 92, connected by a tributary span 95 between nodes 246 and 241, co-located at site 29, and further connected by a tributary span 95' between nodes 244 and 243 co-located at site 29'.

One option, without using transparency, is to upgrade ring 91 to a OC-192 ring by replacing the OC-48 ring nodes 240, 242, 244, and 246 with OC-192 ring nodes 250, 252, 254, and 256, as shown in FIG. 9B.

Another option, shown in FIG. 9C, is to upgrade ring 91 to an OC-192 2F ring 93, with a portion of the OC-48 ring 92 nested within it. This option frees up low speed ADMs and the interconnect, and one fiber route, 10. Traffic between nested ADMs 240 and 242 is carried over span 9', as shown by dotted line.

Figure 10A:
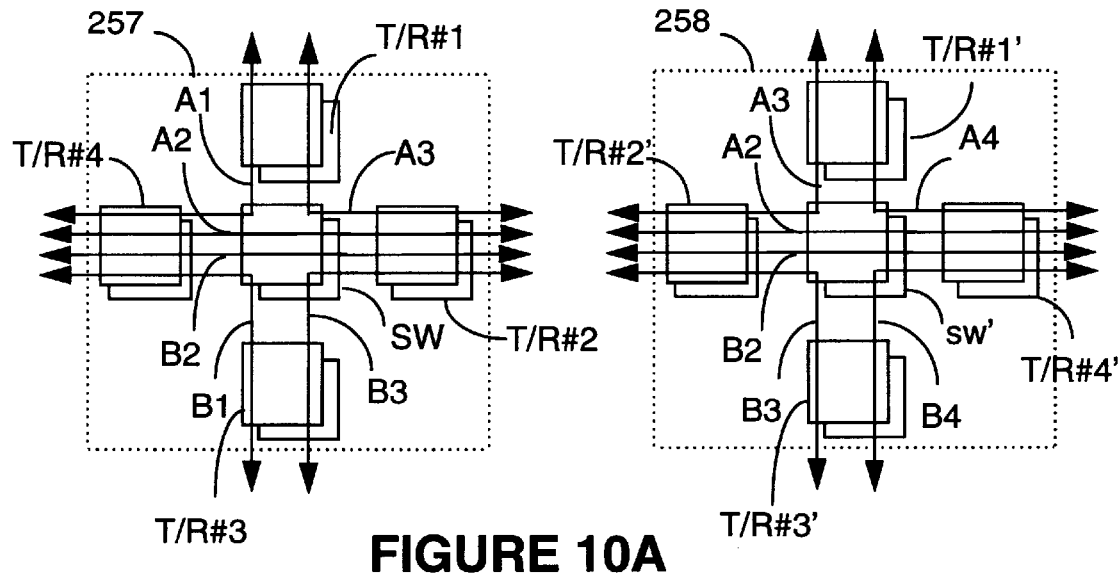
FIGS. 10A and 10B illustrates how traffic is switched between the principal and secondary nodes of FIG. 9C.
Figure 10B:
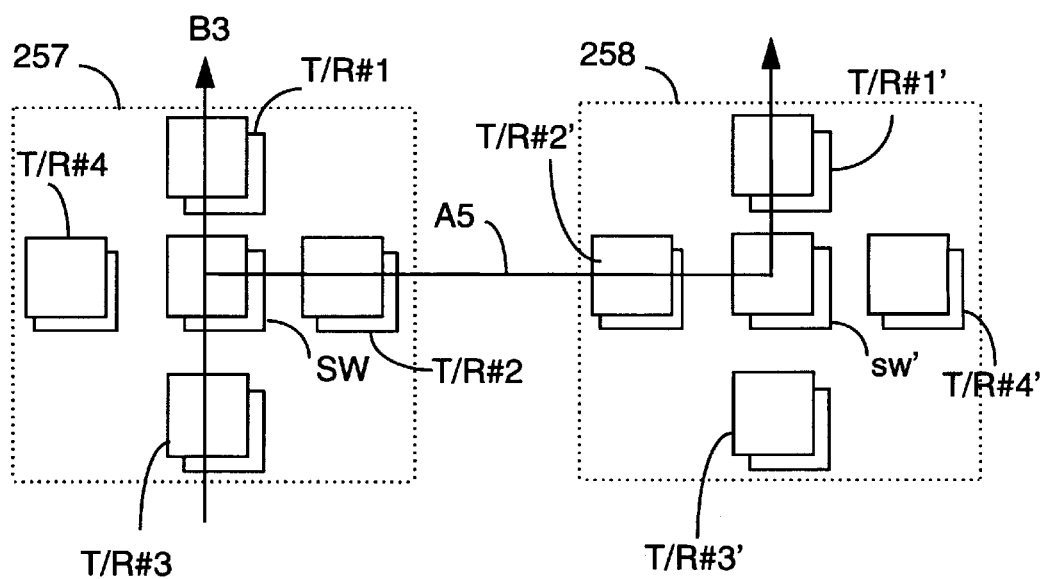
Figure 10C:
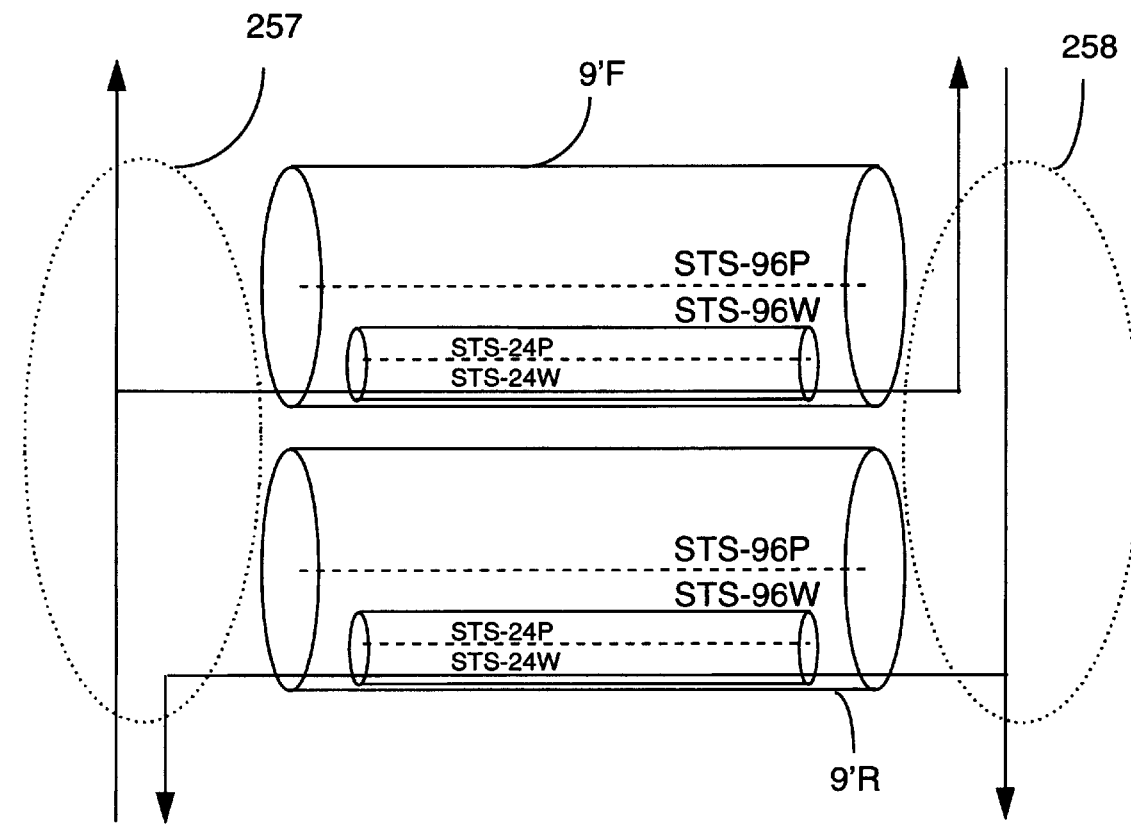
FIG. 10C shows how traffic is carried between the principal and secondary nodes of FIG. 9C.

FIGS. 10A and 10B illustrates how traffic is routed between ADMs 257 and 258, while FIG. 10C expands on how the inter-ring traffic is carried over the OC-192 span between these nodes, as in the example of FIG. 9C. OC-192 transmitter/receiver T/R#1 of primary node 257 exchanges traffic with ADM 250 (arrow A1), and with ADM 258 (arrow A3) of OC-192 ring 93 through OC-192 T/R#2.

T/R#3 of primary node 257 is connected to ADM 246 (arrow B1), and to ADM 258 (arrow B3) over OC-48 ring 92 through OC-192 T/R#2. T/R#2 handles both OC-192 and OC-48 traffic for the respective ring 93 (arrows A3 and A2) or 92 (arrows B3 and B2), while T/R#4 handles both OC-192 traffic as shown by arrows A1 and A2, and OC-48 traffic, as shown by arrows B1 and B2. Switch SW directs traffic on the respective ring. Secondary node 258 operates in a similar way.

The OC-48 traffic is carried over the working timeslots of span 9', using half of the working bandwidth, as shown in FIG. 10C. This maintains independence of OC-48 and OC-192 protection. For inter-ring traffic, the service selector is at the sink node, not at the principal node 257 as usual. The relationship between the principal node 257 and secondary node 258 is flipped between the rings, similar to BLSR opposite side routing.

While the invention has been described with reference to particular example embodiments, further modifications and improvements which will occur to those skilled in the art, may be made within the purview of the appended claims, without departing from the scope of the invention in its broader aspect.

We claim:

1. A telecommunications network operating according to the SONET/SDH standard, comprising:
   a pair of transparent multiplexers (T-Muxs) connected over a bidirectional high speed span for transparently transporting high rate traffic; and
   a plurality (I) of bidirectional self-healing rings, each ring ($K_i$) having a ring rate $R_i$, and including at least two nodes ($A_i$, $B_i$) connected to each other and to said transparent multiplexers over a i-th WIP line for transporting working and protection traffic in a forward direction, and a i-th P/W line for transporting protection and working traffic in a reverse direction,
   wherein I is four, i is the index of a respective bidirectional self-healing ring, and said high rate is the sum of all said ring rates $R_i$ and is an STS-48/STM-16.

2. A network as claimed in claim 1, wherein said high speed span comprises a forward (W) line, a reverse (W) line, a forward (P) line and a reverse (P) line for bidirectionally transporting working traffic and protection traffic received at ring rate $R_i$ from said plurality (I) of bidirectional self-healing rings.

3. A network as claimed in claim 1, wherein all said rings $K_i$ have the same ring rate $R_i$.

4. A network as claimed in claim 1, wherein I=15, each said ring rate $R_i$ is STS-12/STM-4, and said high rate is STS-192/STM-64.

5. A telecommunications network operating in accordance with the SONET/SDH standard, comprising:

a transparent multiplexer (T-Mux) for connection into a high speed sub-network;

a plurality (I) of bidirectional self-healing rings, each ring ($K_i$) including a subtended node connected to said transparent multiplexer over a i-th W/P line for transporting working and protection traffic in a forward direction, and a i-th P/W line for transporting protection and working traffic in a reverse direction at a ring rate $R_i$, wherein I, N are integers, I=4 and said high rate is the sum of all said ring rates $R_i$ and is STS-192/STM-64.

6. A network as claimed in claim 5, wherein I=15, said ring rate $R_i$ is STS-12/STM-4, and said high rate is STS-192/STM-64.

7. A transparent ADM for a telecommunications network operating according to a synchronous transfer mode standard, at a high traffic rate comprising:

a trib input port and a trib output port for respectively receiving K input tribs and transmitting K output tribs, each trib of a bandwidth $R_i$;

an add/drop port for adding and dropping L local tribs;

a transparent multiplexer for transparently multiplexing said K input tribs and said add local traffic into an output high rate signal; and a transparent demultiplexer for receiving an input high rate signal and demultiplexing same into said K output trib signals and said L drop tribs.

8. A telecommunications network operating according to a synchronous transfer mode standard, comprising:

a plurality (J) of transparent add-drop multiplexers (ADM-T) connected in a high rate bidirectional self-healing ring configuration over a high speed span;

at each ADM-$T_j$ site, a plurality (L) of nodes subtended by said ADM-$T_j$ and connected to said ADM-$T_j$ over a l-th W/P line for transporting working and protection traffic in a forward direction, and a l-th P/W line for transporting protection and working traffic in a reverse direction at a ring rate $R_l$;

a plurality (M) of bidirectional self-healing rings including said ADM-$T_j$, each ring ($K_m$) including at least two nodes connected to each other and to said ADM-$T_j$ over a m-th W/P line for transporting working and protection traffic in a forward direction, and a m-th P/W line for transporting protection and working traffic in a reverse direction at a ring rate $R_m$, wherein J, L, and M are integers, j is the index of a respective ADM-T in said high rate bidirectional self-healing ring configuration, l is the index of a respective subtended node, m is the index of a respective bidirectional self-healing ring, and said high rate is $L \times R_l + M \times R_m$.

9. A network according to claim 13, wherein all said rings $K_m$ have the same ring rate $R_m = R_l = R$.

10. A network as claimed in claim 5, wherein M=L=4, said ring rate R is STS-48/STM-16, and said high rate is STS-192/STM-64.

11. A telecommunications network operating according to a synchronous transfer mode standard, comprising:

a first transparent ADM and a second transparent ADM connected in a main network over a high speed span for transmitting a high rate signal including a main signal and a subsidiary signal nested within said main signal;

a first lower rate ADM at the site of said first ADM and a second lower rate ADM at the site of said second ADM for communicating to each other over said subsidiary signal;

a first additional input/output port at said first ADM for transferring said subsidiary signal to and from said first lower rate ADM; and a second additional input/output port at said second ADM for transferring said subsidiary signal to and from said second lower rate ADM.

* * * * *